US009221216B2

(12) United States Patent
Chen et al.

(10) Patent No.: US 9,221,216 B2
(45) Date of Patent: Dec. 29, 2015

(54) COMPUTER NUMERICAL CONTROL (CNC) ADDITIVE MANUFACTURING

(75) Inventors: Yong Chen, Burbank, CA (US); Chi Zhou, Riverside, CA (US)

(73) Assignee: UNIVERSITY OF SOUTHERN CALIFORNIA, Los Angeles, CA (US)

(*) Notice: Subject to any disclaimer, the term of this patent is extended or adjusted under 35 U.S.C. 154(b) by 633 days.

(21) Appl. No.: 13/571,066

(22) Filed: Aug. 9, 2012

(65) Prior Publication Data

US 2013/0037993 A1 Feb. 14, 2013

Related U.S. Application Data

(60) Provisional application No. 61/521,579, filed on Aug. 9, 2011.

(51) Int. Cl.
*B29B 13/08* (2006.01)
*B29C 67/00* (2006.01)

(52) U.S. Cl.
CPC .................................. *B29C 67/0066* (2013.01)

(58) Field of Classification Search
CPC .. B29B 13/08; B29C 67/0066; B29C 67/0088
See application file for complete search history.

(56) References Cited

U.S. PATENT DOCUMENTS

| 4,575,330 A | 3/1986 | Hull |
| 4,801,477 A * | 1/1989 | Fudim .......................... 427/510 |
| 7,636,610 B2 | 12/2009 | Schillen et al. |

OTHER PUBLICATIONS

3D Systems, Inc. Stereolithography (SLA®). 2011. 2 pages. (Downloaded Jan. 16, 2013 from http://www.3dproparts.com/technologies/stereolithography-sla).
Bourell, D. et al. 2009. Roadmap for Additive Manufacturing: Identifying the Future of Freeform Processing, NSF Workshop, Washington, D.C., Mar. 30-31, 2009. Published by the University of Texas at Austin, Laboratory for Freeform Fabrication Advanced Manufacturing Center, Austin, TX, 2009, 102 pages.
Chen, Y. et al. 2011. A Layerless Additive Manufacturing Process Based on CNC Accumulation. Rapid Prototyping Journal, vol. 17, No. 3, pp. 218-227.
EnvisionTEC. 2011. Manufacturing Industrial Catalog. Nov. 2011. (Downloaded Jan. 16, 2013 from http://envisiontec.com/envisiontec/wp-content/uploads/ 2012/12/manufacturing-industrial-catalog-nov-2011.pdf).
Hubert, M. et al. 2003. High Power UV LED Array for Curing Photoadhesives. Proceedings of SPIE, vol. 5260, Applications of Photonic Technology 6, edited by Roger A. Lessard, Georges A. Lampropoulos (SPIE, Wellingham, WA, 2003), pp. 163-168.
Kanakanala, D. 2010. Multi axis slicing for rapid prototyping. Master's Thesis, Missouri University of Science and Technology, 54 pages.

(Continued)

*Primary Examiner* — James Sanders
(74) *Attorney, Agent, or Firm* — McDermott Will & Emery LLP

(57) ABSTRACT

An additive manufacturing system and process are described. In one example of the invention, a fiber optic cable connected with an ultraviolet (UV) LED and related lens forms an accumulation tool. The cable is then merged inside a tank filled with liquid resin that is UV-curable. By controlling the on/off state of the UV-LED and the multi-axis motion of the cable, a physical model, having a desired shape, can be built by selectively curing liquid resin into solid.

21 Claims, 12 Drawing Sheets

A schematic illustration of the CNC accumulation process.

(56) References Cited

OTHER PUBLICATIONS

Kataria, A. et al. 2000. Building Around Inserts: Methods for Fabricating Complex Devices in Stereolithography. Proceedings of DETC '00, 2000 ASME Design Engineering Technical Conferences and Computers and Information in Engineering Conference, Baltimore, Maryland, Sep. 10-13, 2000, 11 pages.
Kataria, A. et al. 2001. Building around inserts: method for fabricating complex devices in stereolithography. Rapid Prototyping Journal, vol. 7, No. 5, pp. 253-261.
Kerschbaumer, M. et al. 2004. Tool Path Generation for 5-Axis Laser Cladding. Joanneum Research Forschungsgesellschaft mbH, presentation dated Sep. 2004; 22 slides.
Kerschbaumer, M. et al. 2004. Tool Path Generation for 3D Laser Cladding Using Adaptive Slicing Technology, Paper #604, Proceedings of the LANE 2004, vol. 2, pp. 831-842.
Liou, F. et al. 2007. Applications of a hybrid manufacturing process for fabrication of metallic structures. Rapid Prototyping Journal, vol. 13, No. 4, pp. 236-244.
Mudge, R. P. et al. 2007. Laser Engineered Net Shaping Advances Additive Manufacturing and Repair, Welding Journal, Jan. 2007, vol. 86, No. 1, pp. 44-48.
Nagel, J.K.S. et al. 2012. Hybrid Manufacturing System Design and Development, Chapter 11. In Manufacturing System, Faieza Abdul Aziz (Ed.), ISBN: 978-953-51-0530-5, InTech, DOI: 10.5772/35597. (Available from: http://www.intechopen.com/books/manufacturing-system/hybrid-manufacturing-system-design-and-development).
OPTOMEC Additive Manufacturing Systems. 2006. Lens Technology. 2 pages (Downloaded Jan. 16, 2013 from http://www.optomec.com/ Additive-Manufacturing- Technology/Laser-Additive-Manufacturing.).
Ruan, J. et al. 2005. "Automatic process planning and toolpath generation of a multiaxis hybrid manufacturing system". ASME Journal of Manufacturing Processes. vol. 7, No. 1, pp. 57-67.
Sundaram, R. et al. 2004. A slicing procedure for 5-Axis laser aided DMD process, ASME Journal of Manufacturing Science and Engineering. vol. 126, pp. 408-415.
Trumpf, Inc. 2008. Direct Metal Deposition. Downloadable video uploaded to Youtube on Mar. 4, 2008, with Robert Ganter of Trumpf, Inc. (Selected screenshots (7) captured Jan. 16, 2013 from https://www.youtube.com/watch?v=iLndYWw5_y8.).
Xie, R. 2012. Research on the curing performance oF UV-LED light based stereolithography, Optics & Laser Technology, vol. 44, No. 4, Jun. 2012, pp. 1163-1171.
Xie, R. et al. 2011. An inexpensive stereolithography technology with high power UV-LED light, Rapid Prototyping Journal, vol. 17, No. 6, pp. 441-450.

\* cited by examiner

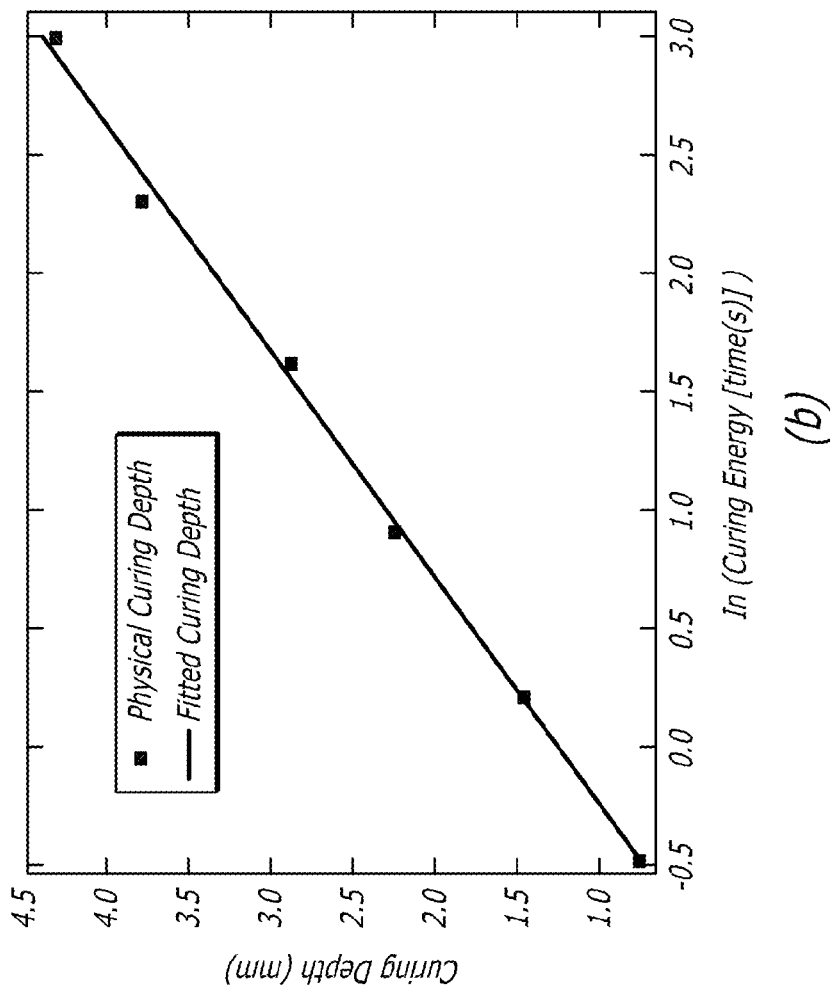
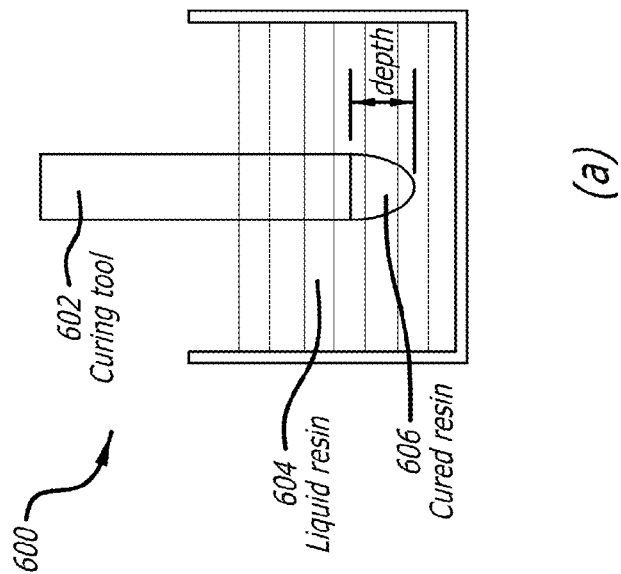
FIG. 6

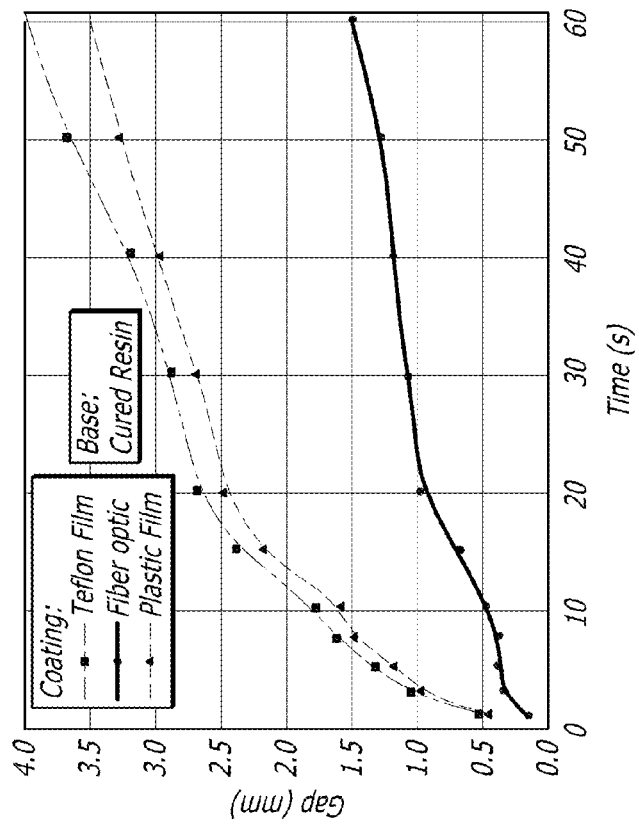
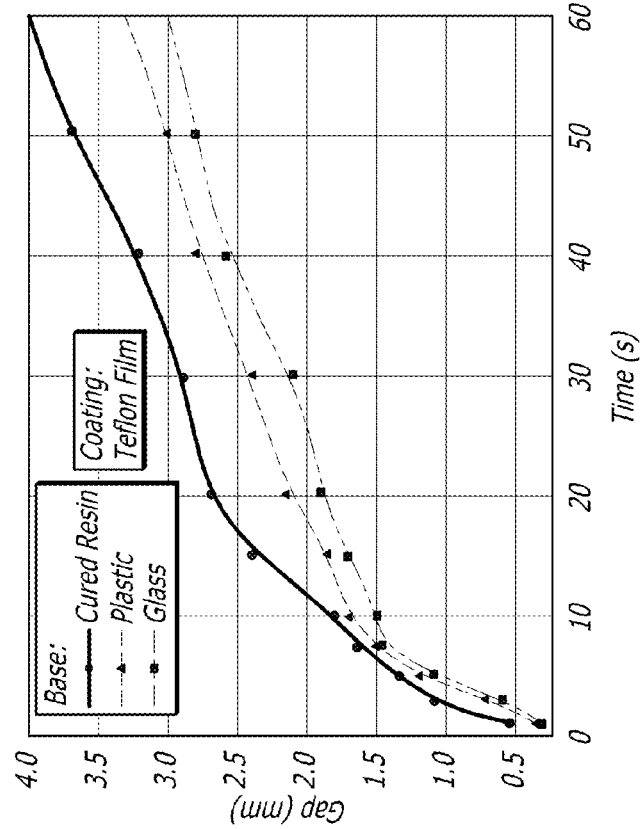
FIG. 8

COMPUTER NUMERICAL CONTROL (CNC) ADDITIVE MANUFACTURING

CROSS-REFERENCE TO RELATED APPLICATION

This application is based upon and claims priority to U.S. provisional patent application 61/521,579, entitled "Additive Manufacturing with Layers: A New Sold Freeform Fabrication Process Based on Computer Numerical Control (CNC) Accumulation," filed 9 Aug. 2011.

The entire content of this application is incorporated herein by reference.

BACKGROUND

1. Technical Field

This disclosure relates to computer numerical control (CNC) manufacturing in general, and, more particularly, to CNC additive manufacturing.

2. Description of Related Art

Most current additive manufacturing (AM) processes are layer-based. By converting a three-dimensional model into two-dimensional layers, the process planning can be dramatically simplified. However, there are also drawbacks associated with such an approach such as inconsistent material properties and difficulty in embedding existing components.

FIG. 1 illustrates a beam structure (a) and a comparison of a prior art additive manufacture process (b) with that of an exemplary process according to the present invention (c). Such an AM process according to the invention can provide for improved building speed and/or improved material properties of the built structure(s) when compared to layered approaches, as will be described in further detail below.

For example, a three-dimensional (3D) beam AB in a beam structure as shown in FIG. 1(a) is first sliced into a set of two-dimensional (2D) layers; a physical model can then be built by stacking all the layers, referring to FIG. 1(b). A significant benefit of the layer-based approach is that, by converting 3D geometry into 2D contours, its process planning is dramatically simplified. However, there are also drawbacks associated with the layer-based approach. For example, beam AB will have different material property depending on its building orientation.

Another drawback of the layer-based AM processes is the limitation on the allowable motions between the tools and the work pieces, which are mainly translational motions in X, Y, and Z axes. Consequently, embedding existing components (i.e. building around inserts) in the processes is usually difficult.

SUMMARY

An additive manufacturing system and process are described. In one example of the invention, a fiber optic cable connected with an ultraviolet (UV) LED and related lens forms an accumulation tool. The cable is then merged inside a tank filled with liquid resin that is UV-curable. By controlling the on/off state of the UV-LED and the multi-axis motion of the cable, a physical model, having a desired shape, can be built by selectively curing liquid resin into solid.

These, as well as other components, steps, features, objects, benefits, and advantages, will now become clear from a review of the following detailed description of illustrative embodiments, the accompanying drawings, and the claims.

BRIEF DESCRIPTION OF DRAWINGS

The drawings are of illustrative embodiments. They do not illustrate all embodiments. Other embodiments may be used in addition or instead. Details that may be apparent or unnecessary may be omitted to save space or for more effective illustration. Some embodiments may be practiced with additional components or steps and/or without all of the components or steps that are illustrated. When the same numeral appears in different drawings, it refers to the same or like components or steps.

FIG. 6 includes views (a)-(b) which depict curing depth versus exposure energy for point curing, in accordance with the present invention.

FIG. 8 depicts views (a)-(b) which show detachable regions of different materials for point curing, in accordance with the present invention.

DETAILED DESCRIPTION OF ILLUSTRATIVE EMBODIMENTS

Illustrative embodiments are now described. Other embodiments may be used in addition or instead. Details that may be apparent or unnecessary may be omitted to save space or for a more effective presentation. Some embodiments may be practiced with additional components or steps and/or without all of the components or steps that are described.

Figure 1:
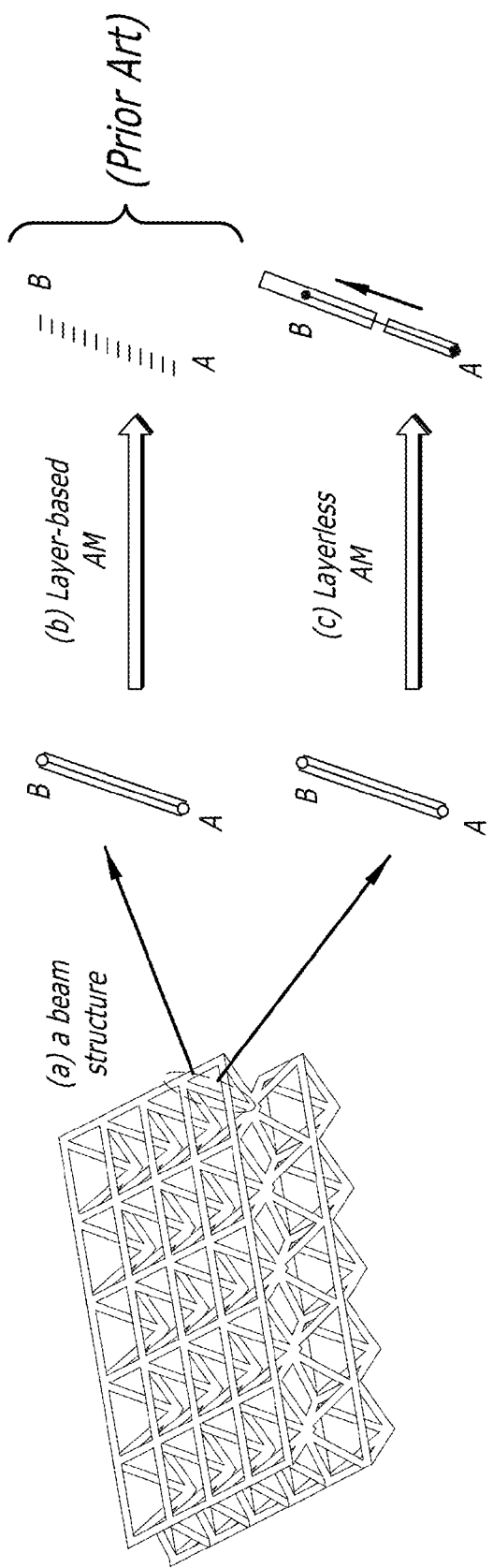
FIG. 1 depicts a comparison of a prior art additive manufacture process (a), and a process (b) according to the present invention.

FIG. 1 illustrates depicts a beam structure (a) and a comparison of a prior art additive manufacture process (b) with that of an exemplary process according to the present invention (c). Such an AM process according to the invention can provide for improved building speed and/or improved material properties of the built structure(s) when compared to layered approaches, as will be described in further detail below.

Figure 2:
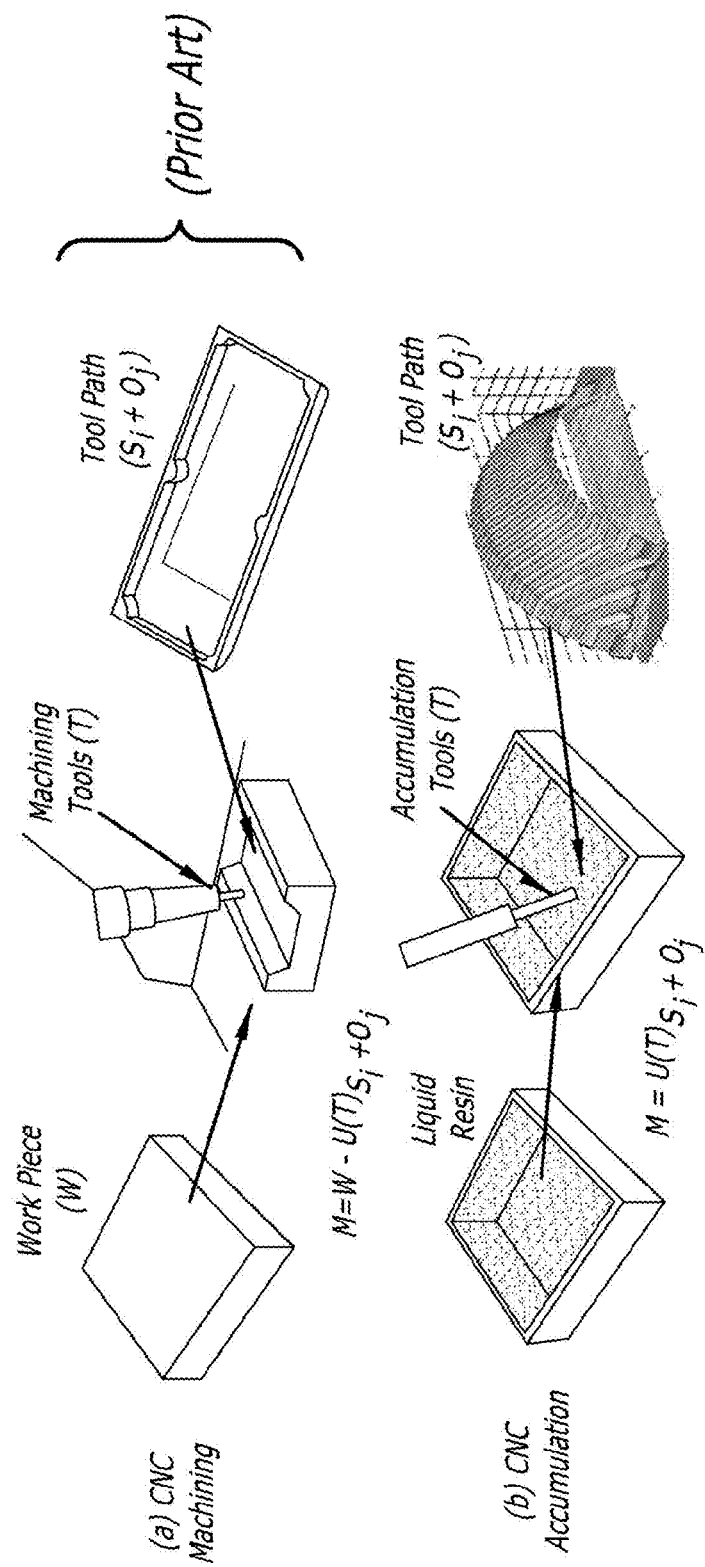
FIG. 2 depicts a comparison of a prior art computer numerical control (CNC) machining process (a), and, a CNC process (b) according to the present invention.

FIG. 2 depicts a comparison of a prior art computer numerical control (CNC) machining process (a), and, a CNC process (b) according to the present invention. The process may be referred to as computer numerically controlled (CNC) accumulation or additive manufacturing (AM). As shown in FIG. 2(a), a CNC machining process typically uses a machining tool to remove the material that is in touch with the tool. Hence, for a given work piece (W) and tool path ($S_i$) with tool orientation in each cutter location ($O_j$), the constructed shape (M) will be M=W−U(T)si+O. In comparison, a CNC accumulation process as shown in FIG. 2(b) can use an accumulation tool to add material that is in touch with the tool. Hence, for tool path ($S_i$) with tool orientation ($O_j$), the constructed shape (M) will be M=U(T)$S_j$-$O_j$.

Suitable materials include those curable by the application of light or heat. In exemplary embodiments, an additive manufacturing process in accordance with the present invention may utilize an ultraviolet (UV)-curable liquid resin such as the ones used in the SLA process. In exemplary embodiments, a SLA resin can be used. Example include but are not limited to the any of the following: Accura Si60 from 3D Systems Inc., and/or Somos® Protogen O-XT 18420, 3D Systems Accura® 55, Somos® Watershed® XC 11122, Somos®, Waterclear® 10120, DSM Somos® Next, and/or Huntsman Renshape 5260 as made commercially available by the Spectrum Plastics Group company; other suitable SLA resins may of course be used in substitution or addition to those listed. Of course while UV-curable resins may be used for some embodiments, other types of curable materials may be used within the scope of the present invention. Examples of such materials include, but are not limited to, resins or other materials curable by infrared light/heat, and resins or other materials curable by visible light.

Figure 3:
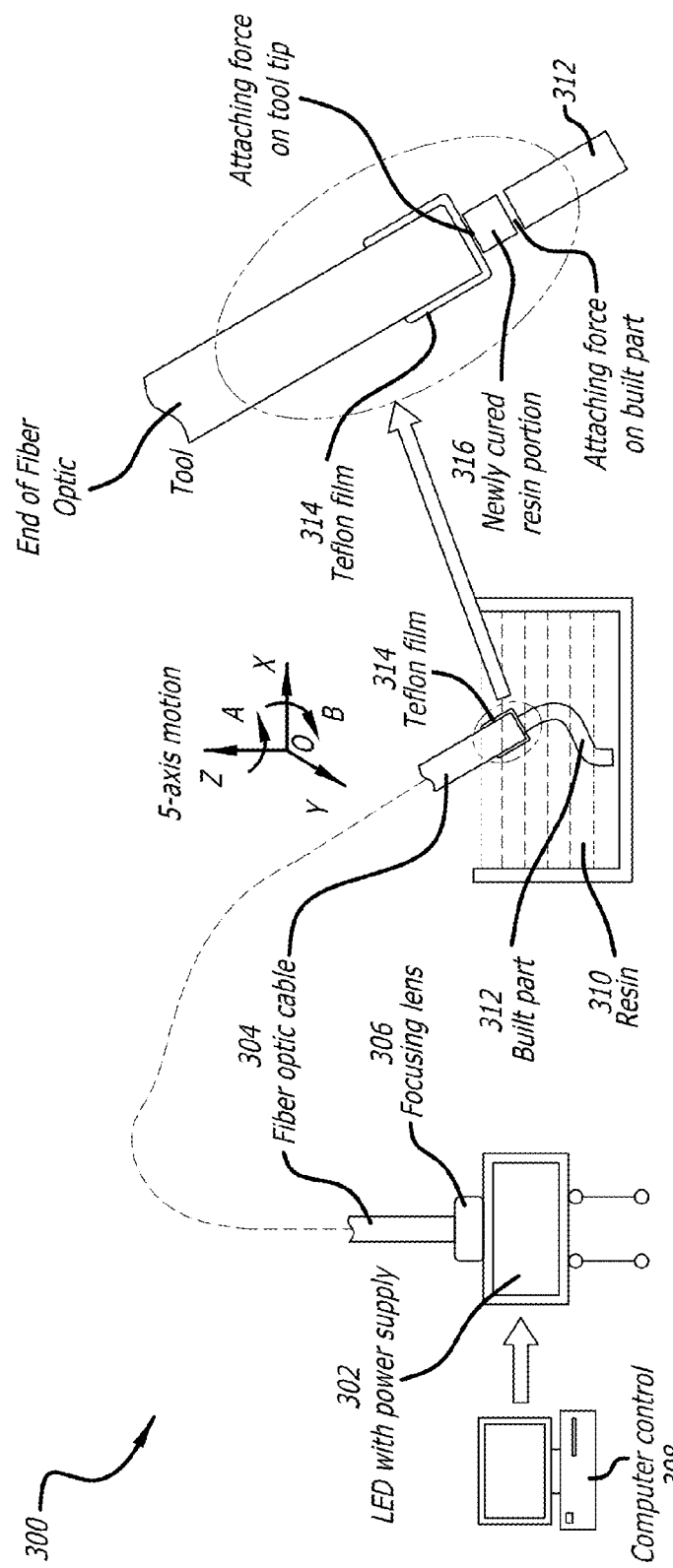
FIG. 3 depicts schematic illustration of an example of a CNC accumulation system and process, in accordance with the present invention.

FIG. 3 depicts a schematic diagram of a system/method 300 according to the present disclosure. It is well known that a UV light source 302 such as a laser can selectively cure liquid resin into solid parts. However, different from the SLA process, a curing tool (end of 304) in a process of the present invention is merged under the liquid resin 310. Therefore, the accumulation tool, or work piece, is capable of curing resin in various directions. However, one main challenge related to allowing the curing tool to directly contact liquid resin is that a newly cured resin portion may attach to the curing tool instead of the base or the previously built part. A study was made of the attaching forces of such a portion that is constrained between the tip of the curing tool and the base or the previously built part 312. The cured resin should attach to the base of the previously built part to ensure the building process to be successful. It was found this can be achieved if: (1) the attaching force between the cured resin and the tool can be reduced by applying certain types of coatings on the tool's tip; and (2) the attaching force between the cured resin and the base or the previously built part can be sufficiently large by adjusting process parameters to ensure adequate over-curing. In some embodiments as tested, the work piece may have a diameter or mean dimension of 3 mm.; of course any suitable size work piece may be utilized and the utility of the present invention will be expanded by different size work pieces. For example, in exemplary embodiments, a work piece may have a working diameter of about 250 microns to about 50 microns; some embodiments can have a diameter of about 200 microns; about 150 microns; about 100 microns; and/or about 50 microns; furthermore, embodiments of the present invention may utilize different work pieces depending on the scale or resolution of the features desired for the build/made product. In some embodiments, kits with different sized tool components may be used or provided. An exemplary setup is shown and described for FIG. 4.

Figure 4:
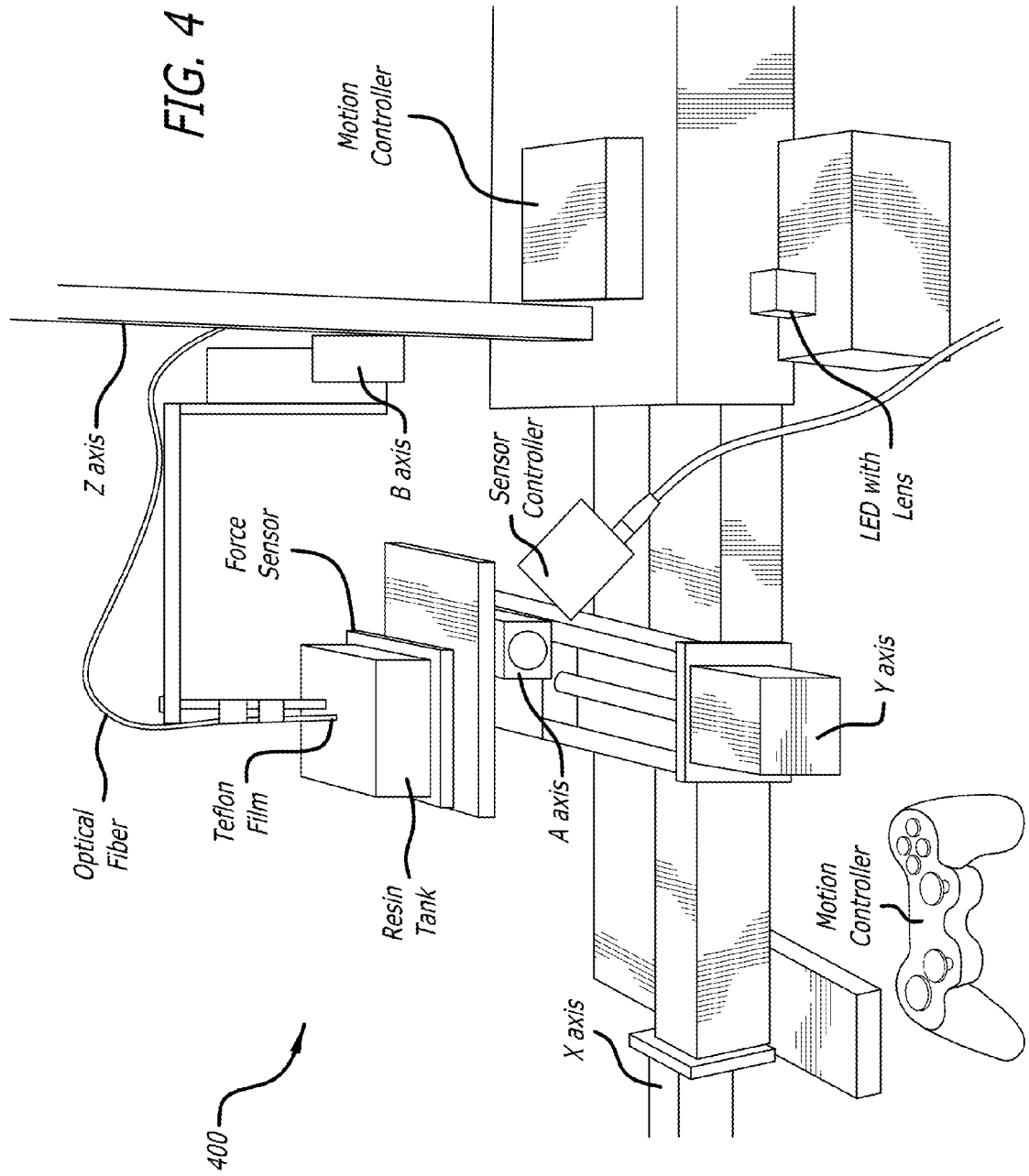
FIG. 4 depicts the hardware components of a CNC accumulation system and process, in accordance with the present invention.

FIG. 4 depicts a hardware setup of for an example of a CNC accumulation system 400 in accordance with the present invention. A high power UV-LED from Nichia (NCSUO33A) is used as the curing light source. Compared to other technologies such as a UV-lamp and a UV-laser diode, a UV-LED has good properties such as inexpensive, low energy consumption, long lifetime and faster switching. On one side of the light guide, a sapphire ball lenses (NT43-831) and a quartz fiber optic light guide (NT38-954), designed for ultraviolet applications, both from Edmunds Optics, can be used to focus and transmit UV light respectively. In exemplary embodiments, the fiber optic cable may have a core of 0.062", 0.125", or 0.250," though of course any suitable sized waveguide may be used. The other side of the light guide is merged in a resin tank as the curing tool. A 5-axis motion system that includes the X, Y, Z axes translation and A, B axes rotation is designed to achieve controllable motion between the tool and the tank. The liquid resin used for exemplary implemented embodiments was Accura Si60 from 3D Systems Inc. The curing tool can be formed by the end of the waveguide (e.g., fiber optic cable) or an optical component coupled directly or indirectly to the waveguide.

Figure 5:
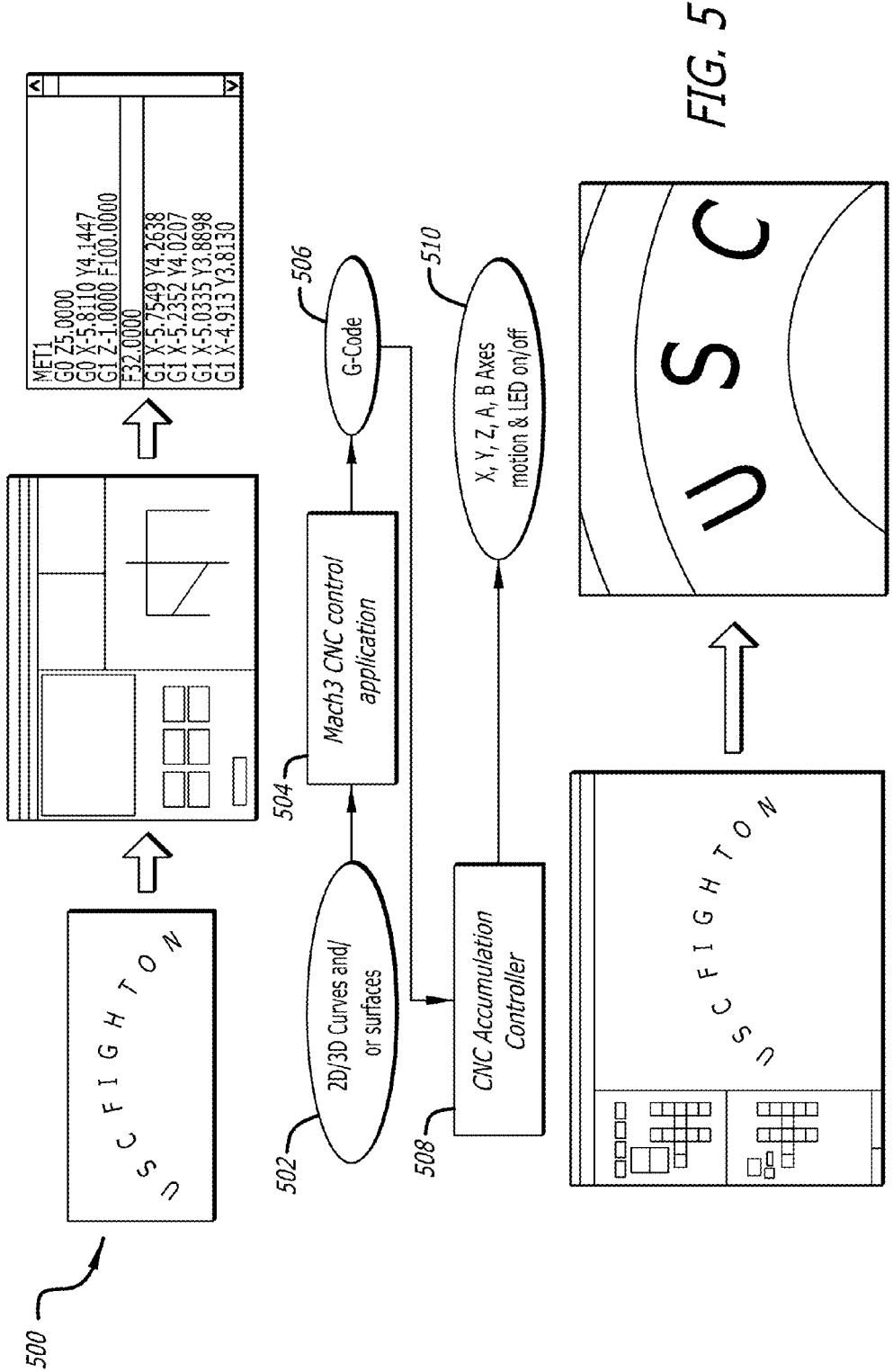
FIG. 5 depicts software components of a CNC accumulation system and method, in accordance with the present invention.

FIG. 5 depicts a schematic diagram showing software components of a CNC accumulation system/method 500 in accordance with the present invention. For a given geometry, e.g., 2D/3D Curves and/or surfaces 502, a suitable control application 505, e.g., an off-the-shelf CNC machining software system, Mach3 CNC control application, as made commercially available by Newfangled Solutions LLC, can be used to convert a Computer-Aided Design (CAD) model into numeric control G-code 506 (e.g., in accordance with the ISO 6983 standard). A developed CNC accumulation controller 508 can read in the G-code and accordingly send commands to a motion controller 510 to drive the 5 axis motion and to a micro-controller to control the LED state (e.g., ON/OFF according to a pulse width modulation control scheme). Hence a physical model can be built based on the planned tool path.

Curing of Liquid Resin

As a preliminary matter, a discussion is offered illustrating the relation between the provided light energy and the related cured resin including its shape and size. Such understanding may be useful for the discussion of attaching force modeling as discussed below.

Previous studies have examined the curing behavior of the SLA process based on a laser beam. For a given type of liquid resin, a critical energy exposure threshold ($E_c$) can be found as the minimum energy requirement. According to the Beer-Lambert exponential law of absorption, the laser exposure will decrease exponentially with depth z. Based on the depth of penetration of resin ($D_p$), the dependence of curing depth $C_d$ upon the maximum exposure at the resin surface follows the equation:

$$C_D = D_p \ln\left(\frac{E_{max}}{E_c}\right) \quad \text{(EQ. 1)}$$

It may be useful to assume a cured line in the shape of a parabolic cylinder will be generated when a UV-laser with laser energy PL scans over the resin surface in a straight line with a constant velocity $V_s$. Accordingly, the curing width and depth of the cured line's cross-section may satisfy the parabolic equation: $ax^2 + bz = c$, where $$a = \frac{2}{W_0^2},\ b = \frac{1}{D_p},\ c = \ln\left\{\frac{P_L}{W_0 V_s E_c}\sqrt{\frac{2}{\pi}}\right\},$$

and $W_0$ is the Gaussian half-width of the laser irradiance distribution (at the $1/e_2$ point). Further deduction of the mathematical analysis can obtain the following important equation:

$$L_w = B\sqrt{\frac{C_d}{2D_p}} \quad \text{(EQ. 2)}$$

where $L_w$ is the line width and $B=2W_0$. This equation shows that the cured line width is proportional to the laser diameter, as well as the square root of the ratio between the curing depth and the resin penetration depth.

Similar to a laser beam, the focused spot of the UV-LED transmitted by the fiber optic light guide follows a Gaussian distribution. Consequently, liquid resin has similar curing behavior in embodiments of the present invention. Hence, both EQ. 1 and EQ. 2 may be useful in modeling processes according to the present invention.

Experiment and Analysis

Figure 7:
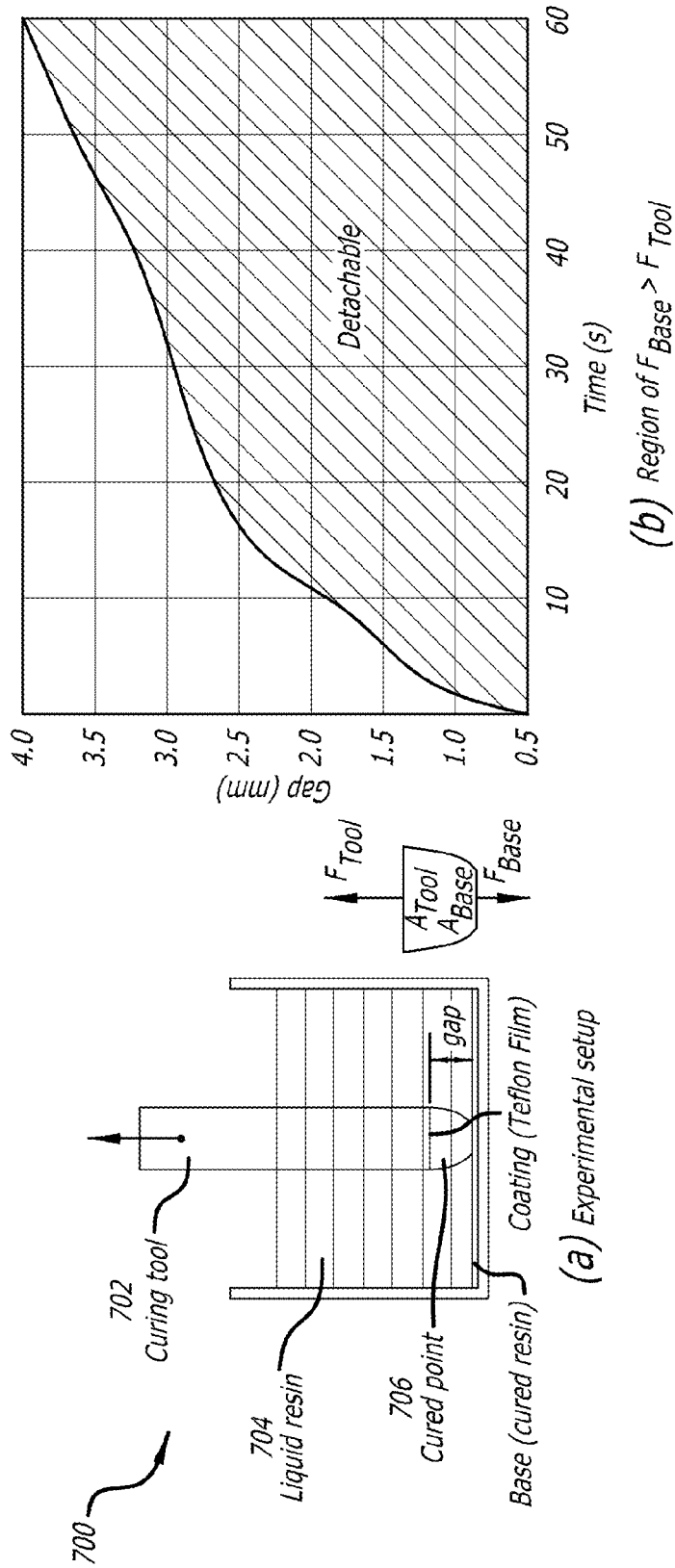
FIG. 7 includes views (a)-(b) and depicts an attaching force study for point curing, in accordance with the present invention.

For verification of the curing behavior of a focused UV-LED used in systems according to the subject technology, experiments based on point curing were performed. As shown in FIG. 6(a), a point curing process was conducted as follows. In a system 600, a UV-LED was first turned on for a certain time. Accordingly, liquid resin 604 was cured on the tip of the light guide 602. The cured resin 606 may have an ogive shape, e.g., is in the shape of a bullet. For different exposure time, the sizes of the cured bullet shapes may be measured. FIG. 7.b shows the relation between the curing depth and the input energy (measured by the curing time). The relation between $C_d$ and ln(E) matches EQ. 1 quite well, which can be approximated by the following equation:

$$C_d = 1.0513 * \ln(T) + 1.2537. \quad (3)$$

Based on the size measurement of the cured bullets (e.g., portions of cured material having a general ogive or bullet shape), one can also approximate the relation between the curing width L, and the curing depth $C_d$ as shown in EQ. 2 by the following equation:

$$L_w = 1.5016\sqrt{C_d} \quad (4)$$

We further assume the curing behavior for point and line curing are identical. Therefore, EQ. 3-4 may provide enablement to compute the curing depth and line width under different exposure time.

Attaching of Point Cured Resin

Since the newly cured resin in a process according to the present invention is in most cases constrained between the curing tool and the base or the previously built part, the attaching forces on the two interfaces may be modeled to ensure the building process to be successful.

Attaching Force Modeling

Suppose $F_{Tool}$ is the attaching force between the cured resin and the tool; and FBase is the attaching force between the cured resin and the base or the previously cured part. In order to separate the cured resin from the curing tool, may require:

$$F_{Base} > F_{Tool} \quad (5)$$

An attaching force F can be determined by the following two factors: (1) The types of material that is in contact with the cured resin. Suppose a coefficient a related to a given material is defined as the attaching force over a unit area. Hence, it is desired to have $a_{Tool}$ as small as possible while $a_{Base}$ as big as possible; (2) The attaching area A. As discussed previously, a bullet shape will be generated for the point curing. Hence, both $A_{Tool}$ and $A_{Base}$ can be estimated for a given curing time T and a gap d between the tool and the base. Note that the attaching area on the curing tool ($A_{Tool}$) will always be bigger than that on the base or the previously built part ($A_{Base}$). Further, for a smaller gap value d, the difference ($A_{Tool} - A_{Base}$) will be smaller.

Hence, to ensure $F_{Base} > F_{Tool}$, the following may be used:

$$\alpha_{Base} A_{Base} > \alpha_{Tool} A_{Tool} \text{ or } \frac{\alpha_{Base}}{\alpha_{Tool}} > \frac{A_{Tool}}{A_{Base}}. \quad \text{(EQ. 6)}$$

In exemplary embodiments, one or more coatings or coating materials are disposed on the surface of the accumulation tool. Such coatings or coating materials can facilitate a reduction in tool attachment force (force of attachment between the cured resin and the tool). Exemplary coating materials include Teflon™ and other types of films such as polydimethylsiloxane (PDMS) film; other suitable materials may be used in substitution or addition to the noted film materials. Any suitable coating may be used, and use of such preferably will satisfy EQ. 6. In addition to coatings, process parameters (e.g., surface area of tool, gap distance, speed of tool movement, etc.) are identified herein which can be tailored such that EQ. 6 is satisfied for an additive manufacturing process according to the present invention.

Referring to FIG. 7, FIG. 7(a) shows an experimental setup 700 for modeling the attaching forces of the point curing. First, a curing tool 702 is positioned to have a gap ci with respect to the bottom of the tank (holding the liquid resin 704). Cured point 706 is shown. After turning on the UV-LED for a certain time $T_{Curing}$, a portion of the resin will be cured and will attach to both the curing tool and the base. Then the UV-LED was turned off and the light guide 702 was slowly moved upwards (as indicated by arrow). Consequently, (i) if $F_{Base} > F_{Tool}$, the cured resin will attach to the base; otherwise, (ii) the cured resin will attach to the curing tool. For different values of $T_{curing}$ and d, one can record which side the cured resin will attach to, and accordingly generate a detachable region for the tested materials in the curing tool and the base. For example, a detachable region based on Teflon film and previously cured resin is shown in FIG. 7(b).

The points in the figure correspond to a critical state $d_c$ where $F_{Tool} \cong F_{Base}$. The shaded portion under the curve denotes the detachable region, i.e., the settings in the region can ensure the newly cured resin attach to the previously cured resin instead of the curing tool. In addition, based on an identified critical state, the ratio $$\frac{\alpha_{Base}}{\alpha_{Tool}}$$

for a curing time ($T_{Curing}$) can be estimated since $$\frac{A_{Tool}}{A_{Base}}$$

related to dc can be computed.

Experiments and Analysis

The detachable regions of various materials have been tested for the point curing. FIG. 8(a) shows, for a Teflon film as the tool material, a comparison between different base materials including plastics, glass and cured resin; FIG. 8(b) shows, for cured resin as the base material, a comparison between different tool materials including Teflon film, plastic film and fiber optic head (i.e. no coating).

Based on the results, the following observations may be made:

1. To ensure the building process to be successful, the exposure time should be increased if a bigger gap value is used; 2. For the same exposure time, using the cured resin and the Teflon film as the base and tool materials respectively can give the largest safe region; and, 3. Since the fiber optic head has the smallest safe region, the CNC accumulation process will likely fail if no coating is applied on the tip of the tool.

Figure 9:
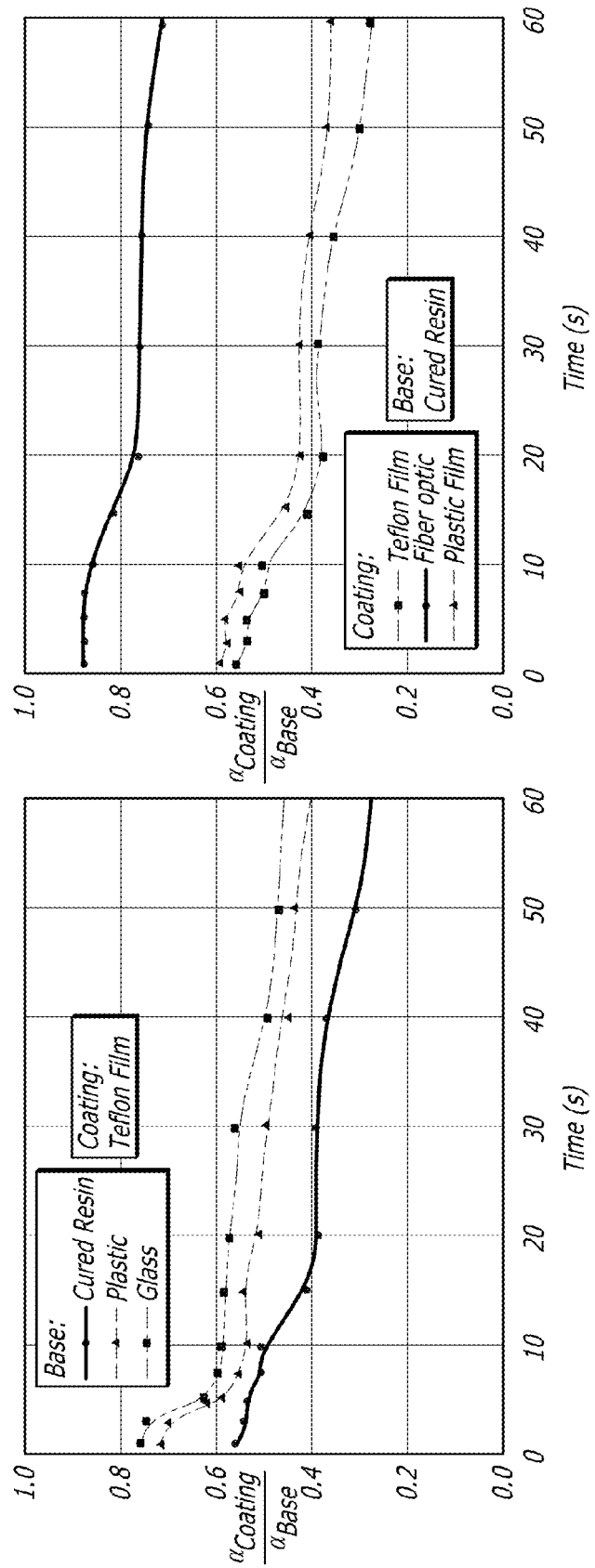
FIG. 9 depicts views (a)-(b) which show a relation between attaching force coefficient and curing time for point curing, in accordance with the present invention.

The ratios $$\frac{\alpha_{Base}}{\alpha_{Tool}}$$

related to different curing time ($T_{Curing}$) are computed from $$\frac{A_{Tool}}{A_{Base}}$$

based on the identified critical gaps, which are shown in FIG. 9.

FIG. 9 includes (a) and (b) which show the relation between the attaching force coefficient ratio and curing time for point curing. FIG. 9(a) is a graph showing the comparison between different bases. FIG. 9(b) is a graph showing comparison between different tool coatings.

It can be observed from the figures that: (1) For all the materials, the attaching force coefficient ratio is decreasing as the curing time is increasing. That is, for a longer curing time, the attaching force on the coating is increasing faster than the attaching force on the base; and, (2) Among all the coating and base materials, the pair of Teflon film and cured resin would give the best performance. In addition, the average attaching force coefficient ratio between them is around 0.4.

Attaching of Line Cured Resin

Similar studies have been performed for the line curing, in which the curing tool is constantly moving in a direction that is orthogonal to the curing direction.

Attaching Force Modeling

Figure 10:
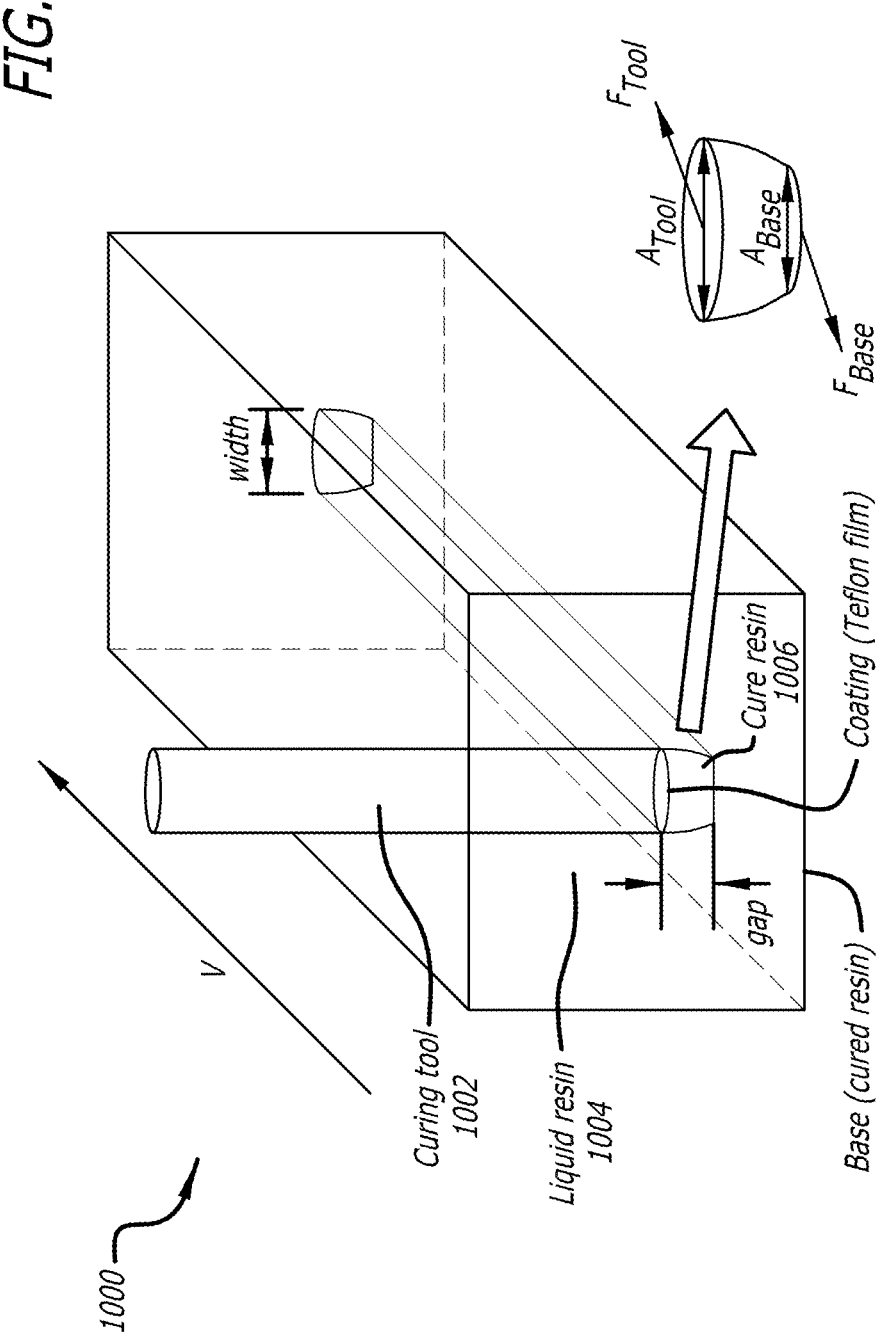
FIG. 10 depicts a three-dimensional (3D) graph showing attaching forces for line curing, in accordance with the present invention.

FIG. 10 depicts a three-dimensional (3D) graph 1000 showing attaching forces for line curing, in accordance with the present invention.

During the line curing, the moving direction of the curing tool 1002 can be different from its curing direction. Liquid resin 1004 is shown in addition to cured resin 1006. Hence the attaching forces are mainly shearing forces as shown in FIG. 10. One can use $F_{Tool}$ as the shearing force between cured resin and the tool, and $F_{Base}$ as the shearing force between cured resin 1006 and the base of the previously cured part. Hence, in order for the cured portion of the resin to successfully separate from the curing tool, it requires $F_{Base} > F_{Tool}$. Based on a similar procedure as discussed previously, a relation between the gap distance and the scanning velocity can be established (see FIGS. 11-12). The test results also indicate that using cured resin as the base and Teflon film as the tool coating may provide optimal performance for line curing.

Experiments and Analysis

Figure 11:
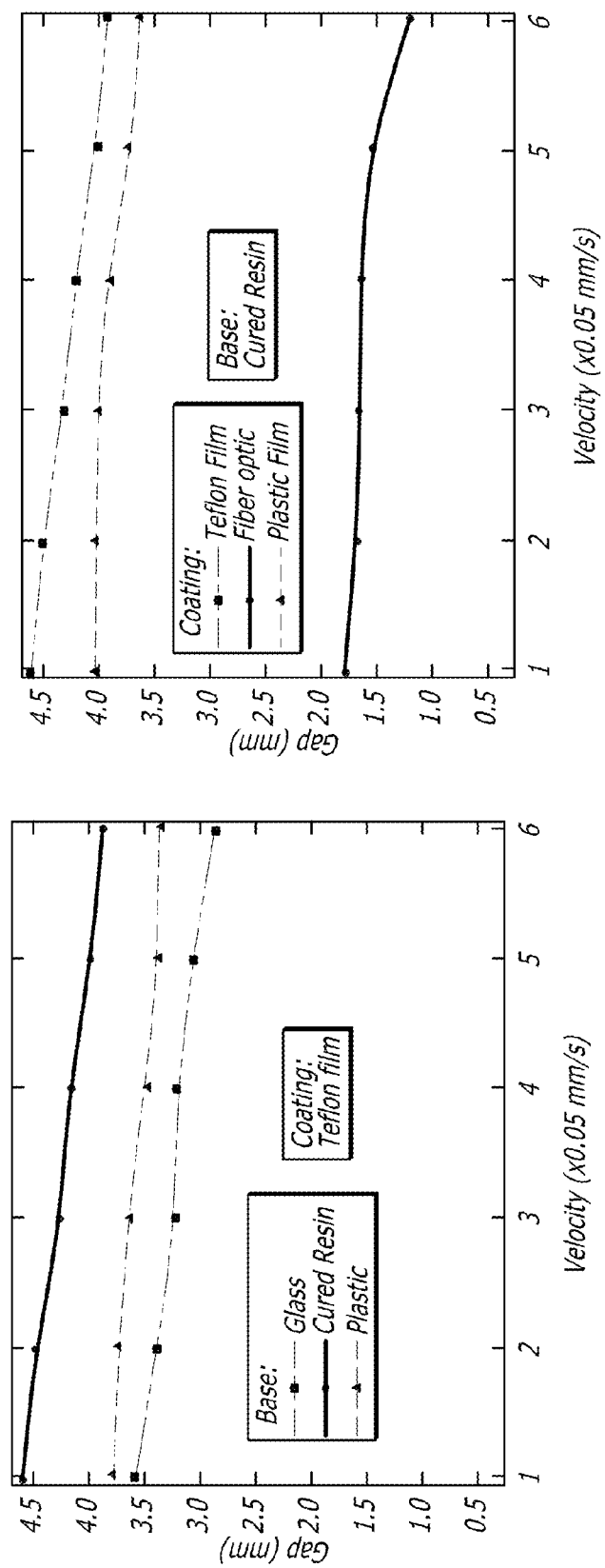
FIG. 11 depicts views (a)-)(b) which show a relation between a gap and scanning velocity for line curing, in accordance with the present invention.

By moving the curing tool at a constant velocity V, portion of the resin between t FIG. 11 includes views (a) and (b) which depict the relation between the gap and scanning velocity for line curing. FIG. 11(a) shows a comparison between different bases while FIG. 11(b) shows comparison between different coatings.

The tool and the base will be cured. The cured resin will attach to either the base if $F_{Base} > F_{Tool}$, or the tool if $F_{Tool} > F_{Base}$. Similar to the procedure described previously, critical states dc were identified for various velocities, and accordingly built detachable regions for various materials. FIG. 11(a) shows, for a Teflon film as the tool material, a comparison between different base materials including plastics, glass and cured resin; FIG. 11(b) shows, for cured resin as the base material, a comparison between different coatings including Teflon film, plastic film and fiber optic head (i.e. no coating).

Figure 12:
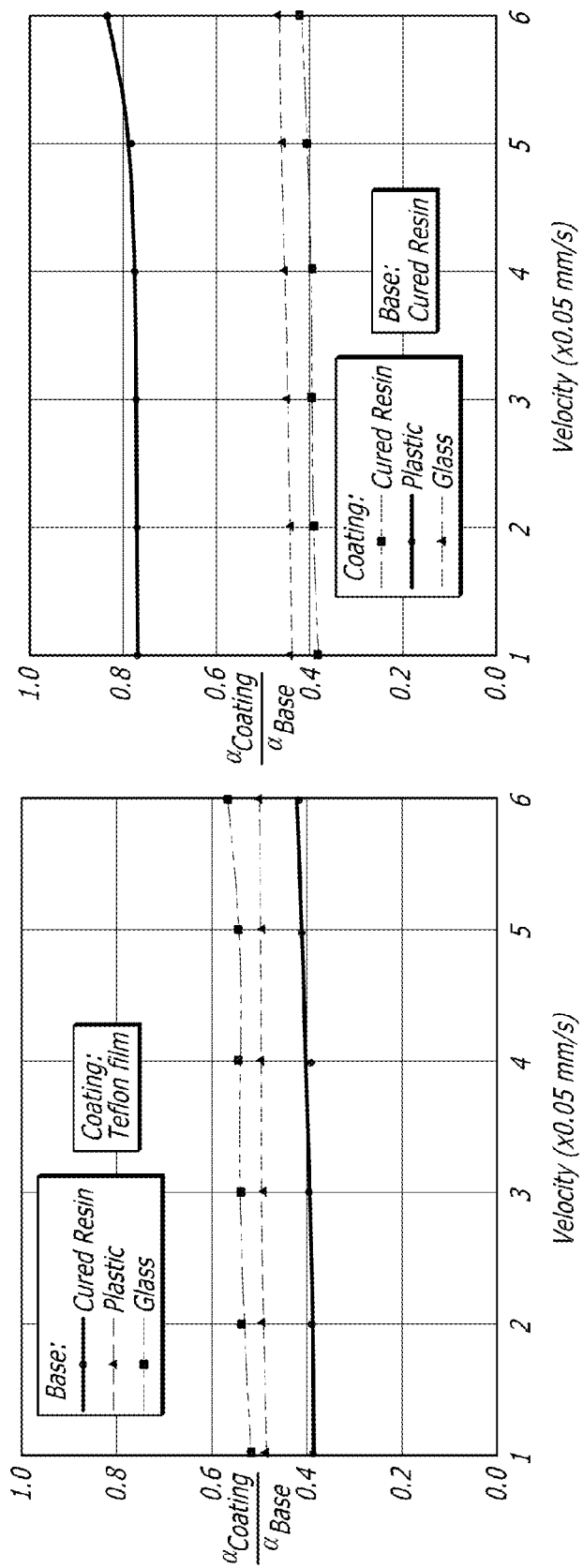
FIG. 12 depicts views (a)-(b) which show a relation between a force coefficient ratio and curing time for line curing, in accordance with the present invention.

The relation between the attaching force coefficient ratio and the moving velocity in the line curing has also been established as shown in FIG. 12. Compared to the point curing results as shown in FIG. 9, the following observations may be made: (1) The coefficient ratio for line curing is consistent to that of point curing. The relative sizes for the tested materials are: $\alpha_{Cured\_Re\ sin} > \alpha_{Plastic} > \alpha_{Glass} > \alpha_{Teflon\_Film}$ and $\alpha_{Cured\_Re\ sin} > \alpha_{Fiber\_Optic} > \alpha_{Plastic\_Film} > \alpha_{Teflon\_Film}$ for both point and line curing; and, (2) The force coefficient ratio for line curing is closer to a constant. In addition, such ratio values are close to the average values of $$\frac{\alpha_{Coating}}{\alpha_{Base}}$$

in point curing.

FIG. 12 includes views (a) and (b) which depict the relation between the force coefficient ratio and curing time for line curing. FIG. 12(a) shows the comparison between different bases while FIG. 12(b) shows a comparison between different coatings.

Exemplary Embodiments: Implemented Examples

Case studies based on various 2D and 3D geometries have been performed. The experimental results have verified that the CNC accumulation process can build the given geometries, and achieve the material accumulation in different directions. In all the test cases, a Teflon film was applied as the coating on the fiber optic head.

2D Curves

A simple square frame and a bridge structure were built to verify the capability of a process of the invention for building 2D curves. Both point and line curing as discussed previously were tested. A more complex 2D shape, a pattern of "I ♥ LA", was also tested. For an input CAD file that defines the pattern, a Mach3 CNC application was used to generate NC G code. Then a CNC accumulation controller was used to convert the generated G-code into control commands to build the part. Both test cases were built on the base of previously cured resin.

2D Surfaces

A 2D planar surface was built to verify the capability of a process of the invention for building 2D surfaces. Based on the approach described for 2D curves, two struts were built as supports. The 2D surface was then built by moving the curing tool along the desired tool path. During the building process, the tool was kept at an angle to the surface such that the newly cured resin can be well bonded to the previously cured portion. As discussed previously, besides cured resin, other types of bases can also be used in processes/systems according to the subject technology. A test on different base materials was performed. In the test, an acrylic plastic plate was used, on which designed characters and decorating patterns were added.

3D Curves:

A half circle was built to verify the capability of a process of the invention on building 3D curves. In the building process, five struts were first added as supports. Since no layers are needed in the building process, the CNC accumulation process may improve the manufacturing efficiency for such geometries. In addition, in building the curve, the curing tool was rotated such that it has an angle that is close to the tangent direction of the curve. Hence, the built part can have an improved bonding strength along the curve.

A more sophisticated case was also performed. In the test, characters "USC FIGHT ON" were added on the inner surface of a plastic bowl. For the purpose, the G Code was first computed for the 3D characters. The rotations of the bowl along Z axis were then computed, and the rotation of the curing tool along X axis for each character. Accordingly, the characters were successfully built. The bonding strength between the built characters and the plastic bowl has been tested to be satisfactory.

3D Surfaces

A 3D cylindrical surface was built to verify the capability of an example of an additive process on building 3D surfaces. Similar to the previous studies, supports were first built to facilitate the building process. Note that a 2D and 3D surface built by the CNC accumulation process may still have anisotropic material property. However, based on design requirements, such anisotropic behavior can be adjusted by planning different tool paths. In addition, the freedom on rotating the curing tool may also improve the material properties of built parts.

Accordingly, the present invention can provide various benefits and advantages compared to previous techniques.

For example, in the context of part repairing and modification, the developed CNC accumulation process can allow for or provide the ability to repair plastic parts and molds. A test case was performed to illustrate such a capability of the process on adding features to a plastic part that was fabricated by other manufacturing processes. In the test, a process according to the invention was used to build a CAD model. Assuming that a new feature was later identified and required to be added, the feature was added to the related tool path, instead of throwing the part away and rebuilding the modified CAD model. The SLA part was then positioned on the tank. Based on the calibration of the part, the CNC accumulation process was used to build the new feature. Similar to the SLA process, the built model was fully cured after the building process. The bonding strength of the added feature was found to be satisfactory.

Current AM processes can only build parts with limited material options. In addition, a wide variety of components can be fabricated much more efficiently by other manufacturing processes. Hence, it is critical for future AM processes to address the requirement of building around inserts, i.e., the capability of integrating existing components that are made by other manufacturing processes in the AM building process. In the CNC accumulation process according to the invention, a part can be built on various base materials from different building directions. Hence, the process can be beneficial for building around inserts. Four test cases are presented as follows to illustrate the capability of the AM process of the invention.

(1) Adding a spring in a multi-functional scissor: A scissor was first designed with two pieces that were laser-cut from an acrylic plastic plate. In the test, a spring was added between the two plastic pieces such that the required motion of the scissor was supported. In addition, it was desirable to use a standard metal spring since the spring will be repeatedly compressed and stretched. An example of an AM process/system according to the invention was used to successfully embed a metal spring with the two plastic pieces.

(2) Adding a magnet bar in a multi-functional scissor: In this test, a magnet bar was added on the top surface of one plastic piece of the scissor such that the scissor can attract small metal parts. The embedded spring and magnet bar were embedded successfully, achieving the desired designed functionality.

(3) Building a decoration part with optical fibers: In the test, a decoration part in a star shape was designed, which has ten embedded optical fibers for transmitting light from a LED. The fixture of optical fibers is usually troublesome since the fibers generally have rather small sizes (e.g., a diameter of 0.25 mm in a tested embodiment). A fixture was first designed to position the optical fibers. Accordingly, a tool path was generated based on the designed shape. A plastic part with the embedded optical fibers was built. Finally, one side of the optical fibers was connected to a controlled LED such that the built part with another side of the optical fibers can exhibit interesting lighting patterns.

(4) Wrapping a resistor: In the test, the capability of an AM process was demonstrated in wrapping existing electric components. Two resistors were used in the test, which were embedded in a built part.

Unless otherwise indicated, the CNC and/or light modulation control that have been discussed herein can be implemented with a computer system configured to perform the functions that have been described herein for the component. Each computer system includes one or more processors, tangible memories (e.g., random access memories (RAMs), read-only memories (ROMs), and/or programmable read only memories (PROMS)), tangible storage devices (e.g., hard disk drives, CD/DVD drives, and/or flash memories), system buses, video processing components, network communication components, input/output ports, and/or user interface devices (e.g., keyboards, pointing devices, displays, microphones, sound reproduction systems, and/or touch screens).

Each computer system for CNC control and/or light modulation control may be a desktop computer or a portable computer, such as a laptop computer, a notebook computer, a tablet computer, a PDA, a smartphone, or part of a larger system, such a vehicle, appliance, and/or telephone system.

A single computer system may be shared for the CNC and/or light modulation.

Each computer system for CNC control and/or light modulation control may include one or more computers at the same or different locations. When at different locations, the computers may be configured to communicate with one another through a wired and/or wireless network communication system.

Each computer system may include software (e.g., one or more operating systems, device drivers, application programs, and/or communication programs). When software is included, the software includes programming instructions and may include associated data and libraries. When included, the programming instructions are configured to implement one or more algorithms that implement one or more of the functions of the computer system, as recited herein. The description of each function that is performed by each computer system also constitutes a description of the algorithm(s) that performs that function.

The software may be stored on or in one or more non-transitory, tangible storage devices, such as one or more hard disk drives, CDs, DVDs, and/or flash memories. The software may be in source code and/or object code format. Associated data may be stored in any type of volatile and/or non-volatile memory. The software may be loaded into a non-transitory memory and executed by one or more processors.

The components, steps, features, objects, benefits, and advantages that have been discussed are merely illustrative. None of them, nor the discussions relating to them, are intended to limit the scope of protection in any way. Numerous other embodiments are also contemplated. These include embodiments that have fewer, additional, and/or different components, steps, features, objects, benefits, and advantages. These also include embodiments in which the components and/or steps are arranged and/or ordered differently.

For example, while certain embodiments have been described herein in the context of utilizing ultraviolet light, other radiation may be used to cure materials for additive manufacturing within the scope of the present invention. In addition, while embodiments are described herein as utilizing a work piece of certain dimensions (e.g., diameter), Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

All articles, patents, patent applications, and other publications that have been cited in this disclosure are incorporated herein by reference.

The phrase "means for" when used in a claim is intended to and should be interpreted to embrace the corresponding structures and materials that have been described and their equivalents. Similarly, the phrase "step for" when used in a claim is intended to and should be interpreted to embrace the corresponding acts that have been described and their equivalents. The absence of these phrases from a claim means that the claim is not intended to and should not be interpreted to be limited to these corresponding structures, materials, or acts, or to their equivalents.

The scope of protection is limited solely by the claims that now follow. That scope is intended and should be interpreted to be as broad as is consistent with the ordinary meaning of the language that is used in the claims when interpreted in light of this specification and the prosecution history that follows, except where specific meanings have been set forth, and to encompass all structural and functional equivalents.

Relational terms such as "first" and "second" and the like may be used solely to distinguish one entity or action from another, without necessarily requiring or implying any actual relationship or order between them. The terms "comprises," "comprising," and any other variation thereof when used in connection with a list of elements in the specification or claims are intended to indicate that the list is not exclusive and that other elements may be included. Similarly, an element preceded by an "a" or an "an" does not, without further constraints, preclude the existence of additional elements of the identical type.

None of the claims are intended to embrace subject matter that fails to satisfy the requirement of Sections 101, 102, or 103 of the Patent Act, nor should they be interpreted in such a way. Any unintended coverage of such subject matter is hereby disclaimed. Except as just stated in this paragraph, nothing that has been stated or illustrated is intended or should be interpreted to cause a dedication of any component, step, feature, object, benefit, advantage, or equivalent to the public, regardless of whether it is or is not recited in the claims.

The abstract is provided to help the reader quickly ascertain the nature of the technical disclosure. It is submitted with the understanding that it will not be used to interpret or limit the scope or meaning of the claims. In addition, various features in the foregoing detailed description are grouped together in various embodiments to streamline the disclosure. This method of disclosure should not be interpreted as requiring claimed embodiments to require more features than are expressly recited in each claim. Rather, as the following claims reflect, inventive subject matter lies in less than all features of a single disclosed embodiment. Thus, the following claims are hereby incorporated into the detailed description, with each claim standing on its own as separately claimed subject matter.

The invention claimed is:

1. A system for additive manufacturing, the system comprising:
   a storage device;
   a processing system connected to the storage device; and
   a program stored in the storage device that causes the processing system to perform functions, including to:
      cause a light emitting tool within a tank of uncured resin that emits light at an intensity sufficient to cure portions of the uncured resin to move in a desired path, thereby causing portions of the uncured resin to cure along the desired path; and
      control the attachment force of resin cured by the light emitting tool by adjusting the gap between the light emitting tool and previously cured resin or by adjusting the speed at which the light emitting tool is moved; or
      control the shape of the cured resin by rotating the light emitting tool about multiple axes.

2. The system of claim 1, wherein the program stored in the storage device causes the processing system to convert a computer-aided design model into a numeric control G-code.

3. The system of claim 1, wherein the processing system comprises a computer numerical control (CNC) accumulation controller.

4. The system of claim 1, wherein the processing system comprises a microcontroller that adjusts the light output in a desired manner.

5. The system of claim 1, wherein the light emitting tool emits ultraviolet light.

6. The system of claim 1, wherein the light emitting tool includes a waveguide having a proximal end disposed to receive light from a light source and a distal end that emits the light.

7. The system of claim 6, wherein the waveguide comprises a fiber optic cable.

8. A system for additive manufacturing, the system comprising:
   a light source;
   a waveguide having a proximal end disposed to receive light from the light source and a distal end;
   a reservoir for holding a curable material;
   a coating on the distal end of the waveguide that reduces attachment force between the distal end of the waveguide and material cured by light emitted from the distal end of the waveguide; and
   a computer numerical control system that:
      causes the distal end of the waveguide to move in a desired path while material in its vicinity is cured by light emitted by the distal end of the waveguide; and
      controls the attachment force of resin cured by the light by adjusting the gap between the waveguide and previously cured resin or by adjusting the speed at which the waveguide is moved; or
      controls the shape of the cured resin by rotating the waveguide about multiple axes.

9. The system of claim 8, wherein the light source comprises an ultraviolet (UV) light source.

10. The system of claim 9, wherein the UV light source comprises a light emitting diode (LED).

11. The system of claim 8, wherein the curable material comprises a stereolithographic curable resin.

12. The system of claim 8, wherein the computer numerical control system comprises a 5-axis CNC machine.

13. The system of claim 8, wherein the waveguide comprises a fiber optic cable.

14. A method of additive manufacturing comprising moving a light emitting tool within a tank of uncured resin in a desired path while the light emitting tool emits light at an intensity sufficient to cure portions of the uncured resin, thereby causing portions of the uncured resin to cure along the desired path, and by:
   controlling the attachment force of resin cured by the light emitting tool by adjusting the gap between the light emitting tool and previously cured resin or by adjusting the speed at which the light emitting tool is moved; or
   controlling the shape of the cured resin by rotating the light emitting tool about multiple axes.

15. The method of claim 14, wherein the light emitting tool comprises using a waveguide.

16. The method of claim 15, wherein the waveguide is a fiber optic cable.

17. The method of claim 14, wherein the resin comprises a stereolithography (SLA) resin.

18. The method of claim 14, wherein the moving is performed by a 5-axis computer numerical control (CNC) machine.

19. The system of claim 1 wherein the program stored in the storage device causes the processing system to control the attachment force of resin cured by the light emitting tool by adjusting the gap between the light emitting tool and previously cured resin.

20. The system of claim 1 wherein the program stored in the storage device causes the processing system to control the attachment force of resin cured by the light emitting tool by adjusting the speed at which the light emitting tool is moved.

21. The system of claim 1 wherein the program stored in the storage device causes the processing system to control the shape of the cured resin by rotating the light emitting tool about multiple axes.

* * * * *